United States Patent
Hasegawa et al.

(10) Patent No.: US 12,032,207 B2
(45) Date of Patent: Jul. 9, 2024

(54) FUSION SPLICER

(71) Applicant: Fujikura Ltd., Tokyo (JP)

(72) Inventors: Ryo Hasegawa, Sakura (JP); Koichi Yokota, Sakura (JP); Noriyuki Kawanishi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/769,335

(22) PCT Filed: Oct. 22, 2020

(86) PCT No.: PCT/JP2020/039784
§ 371 (c)(1),
(2) Date: Apr. 15, 2022

(87) PCT Pub. No.: WO2021/079950
PCT Pub. Date: Apr. 29, 2021

(65) Prior Publication Data
US 2024/0142703 A1    May 2, 2024

(30) Foreign Application Priority Data

Oct. 24, 2019  (JP) ................................. 2019-193687
Feb. 21, 2020  (WO) .................. PCT/JP2020/008565
Oct. 6, 2020   (JP) ................................. 2020-169363

(51) Int. Cl.
*G02B 6/255*        (2006.01)
(52) U.S. Cl.
CPC ......... *G02B 6/2553* (2013.01); *G02B 6/2555* (2013.01)

(58) Field of Classification Search
CPC .......................................... G02B 6/2555–2557
See application file for complete search history.

(56) References Cited

U.S. PATENT DOCUMENTS 9,033,325 B2 *   5/2015  Iwashita .............. G02B 6/2553
                                                       385/35
9,146,353 B2 *   9/2015  Kawanishi ........... G02B 6/3616
(Continued)

FOREIGN PATENT DOCUMENTS

CN      103364876 A     10/2013
CN      103364877 A     10/2013
(Continued)

OTHER PUBLICATIONS

International Search Report issued in corresponding International Application No. PCT/JP2020/039784 dated Nov. 25, 2020 (2 pages).

*Primary Examiner* — Omar R Rojas
(74) *Attorney, Agent, or Firm* — Osha Bergman Watanabe & Burton LLP

(57) ABSTRACT

A fusion splicer includes: a heater that heats a glass of an optical fiber; a pair of clamps that clamp a coated part of the optical fiber, wherein the pair of clamps is constituted by: a lower clamp on which a coated part of the optical fiber is disposed; and a coated part clamp that presses the coated part of the optical fiber against the lower clamp; a windproof cover that covers the heater and the coated part clamp; a retreat mechanism that causes the coated part clamp to retreat from the lower clamp; an opening/closing mechanism that opens and closes the windproof cover; and a pair of glass clamps attached to an inner surface of the windproof cover.

6 Claims, 13 Drawing Sheets

(56) References Cited

U.S. PATENT DOCUMENTS

2014/0075999 A1    3/2014   Sasaki
2014/0083141 A1    3/2014   Iwashita

FOREIGN PATENT DOCUMENTS

| CN | 204256213 U | 4/2015 |
|---|---|---|
| CN | 208999602 U | 6/2019 |
| CN | 216411636 U | 4/2022 |
| JP | 2000-019339 A | 1/2000 |
| JP | 2000-028842 A | 1/2000 |
| JP | 2014038361 A | 2/2014 |
| JP | 2014-062930 A | 4/2014 |
| JP | 2014-119513 A | 6/2014 |
| JP | 5512786 B1 | 6/2014 |
| KR | 10-2004-0075977 A | 8/2004 |

\* cited by examiner

FUSION SPLICER

CROSS-REFERENCE TO RELATED APPLICATIONS

The present application claims priority from Japanese Patent Application No. 2019-193687, filed in Japan on Oct. 24, 2019, Japanese Patent Application No. 2020-169363, filed in Japan on Oct. 6, 2020, and International Patent Application No. PCT/JP2020/008565, filed in Japan on Feb. 21, 2020, the contents of which are incorporated herein by reference in their entirety.

BACKGROUND

Technical Field

The present invention relates to a fusion splicer.

Description of Related Art

Patent Document 1 discloses a fusion splicer which heats optical fibers for fusion splicing. The fusion splicer includes a coated part clamp (upper clamp member) that presses an optical fiber, and a movable stage positioned below the coated part clamp and configured to support the optical fiber. The movable stage can move forward and backward due to a power source. The power source of the movable stage is connected also to the coated part clamp by a gear train, and when the movable stage moves backward, an operation of opening the coated part clamp using power of the power source is performed.

PATENT DOCUMENT

Patent Document 1: Japanese Patent No. 5512786

Since a coated part clamp has a role of fixing an optical fiber at the time of fusion splicing, generally, a force (closing force) for maintaining the coated part clamp in a closed state is set strong. In the configuration of Patent Document 1, in order to overcome the closing force and open the coated part clamp, it is required to increase a speed reduction ratio of the gear train between the power source and the coated part clamp. When the speed reduction ratio is increased, an operation time at the time of opening the coated part clamp becomes longer. Also, when a high-output power source is used, a speed reduction ratio and an operation time can be reduced, but this leads to an increase in size of the device.

In one or more embodiments, an operation time at the time of opening a coated part clamp can be reduced while using a low-output power source.

SUMMARY

According to one or more embodiments, a fusion splicer includes a heater which heats a glass part of an optical fiber, a pair of clamps that clamp the coated part, the pair constituted by a lower clamp on which a coated part of the optical fiber is placed and a coated part clamp which sandwiches the optical fiber between the coated part clamp and the lower clamp (i.e., presses the coated part against the lower clamp), a windproof cover which covers the heater and the coated part clamp, and a retreat mechanism which causes the coated part clamp to retreat from the lower clamp, an opening/closing mechanism which drives the windproof cover, and a pair of glass clamps which are attached to an inner surface of the windproof cover. The retreat mechanism includes a power source, a rotating member which is rotatable around a rotation center, an elastic member that elastically deforms by power received from the power source and thereby stores elastic energy, a transmission part which pushes the coated part clamp upward due to an elastic force received from the elastic member, and a restricting part which restricts rotation of the rotating member while the elastic member stores the elastic energy in a state in which the windproof cover is closed, and the restricting part releases the elastic energy stored in the elastic member and thereby releases restriction on rotation of the rotating member in conjunction with an opening operation of the windproof cover.

According to one or more embodiments, the elastic member can be elastically deformed by driving the power source after the optical fiber is set and the windproof cover and the coated part clamp are closed. Then, since restriction on displacement of the transmission part is released in conjunction with an opening operation of the windproof cover after the fusion splicing is completed, the transmission part can be displaced and the coated part clamp can be pushed upward by the elastic force received from the elastic member. As described above, when power obtained from the power source is stored in the elastic member using a time while the fusion splicing or the like is performed and then an elastic energy is released in a short period of time, the coated part clamp can be opened by overcoming a closing force of the coated part clamp while using a low-output power source.

Here, the transmission part may include a pin which is positioned between the coated part clamp and the rotating member and is slidably movable in a vertical direction, and the pin may slide upward and push the coated part clamp upward when the rotating member receives the elastic force and rotates.

Also, the transmission part may include a rotating member which is rotatable around a rotation center, and the rotating member may push the coated part clamp upward when the rotating member receives the elastic force and rotates.

Also, in the fusion splicer according to the above-described aspect, the restricting part may be fixed to the windproof cover.

Further, the windproof cover may be constituted by a first segmented member driven by the opening/closing mechanism, and a second segmented member driven by a second opening/closing mechanism, and the restricting part may be fixed to the second segmented member.

Also, the windproof cover may be constituted by a first segmented member driven by the opening/closing mechanism, and a second segmented member driven by the power source, power of the power source may be transmitted to the second segmented member via the elastic member, and the restricting part may be fixed to the first segmented member and may release restriction on rotation of the rotating member in conjunction with an opening operation of the first segmented member.

According to one or more embodiments, an operation time at the time of opening the coated part clamp can be reduced while using a low-output power source.

DETAILED DESCRIPTION

First Example

Hereinafter, a fusion splicer of one or more embodiments will be described with reference to the drawings.

Figure 1A:
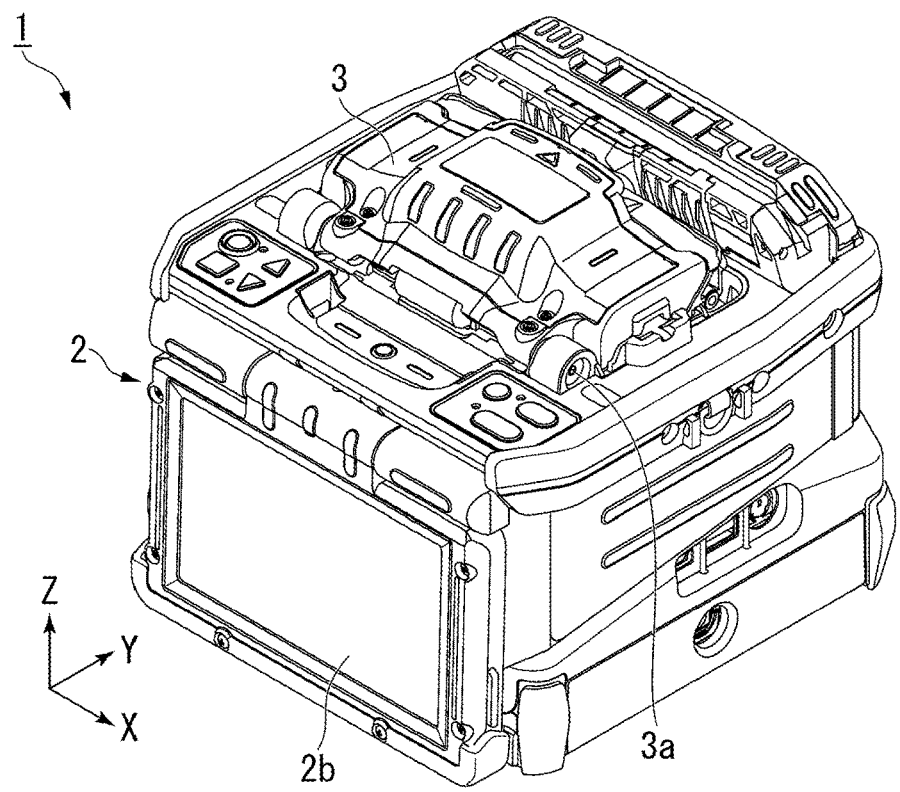
FIG. 1A is a perspective view of a fusion splicer according to one or more embodiments.
Figure 1B:
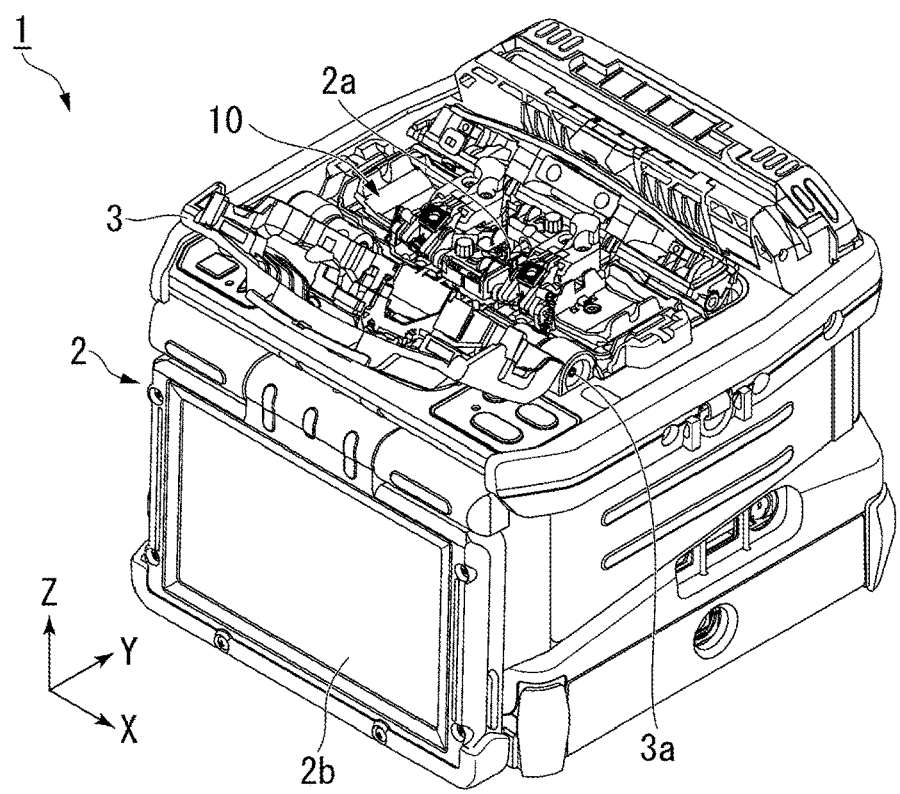
FIG. 1B is a perspective view showing a state in which a windproof cover of FIG. 1A is opened.
Figure 2:
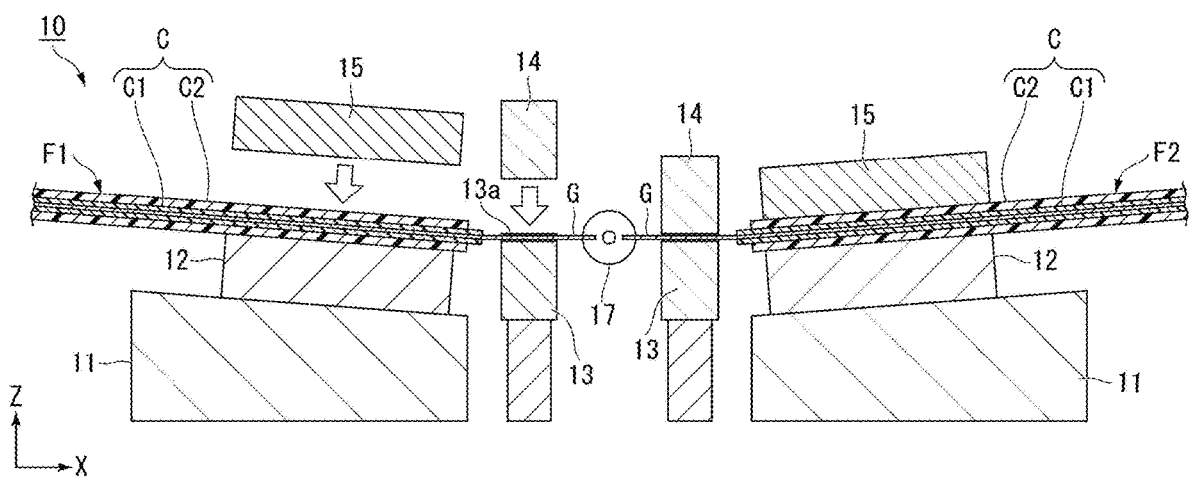
FIG. 2 is a schematic view of a splicing structure provided in the fusion splicer of one or more embodiments from a front-rear direction.

As shown in FIGS. 1A, 1B, and 2, a fusion splicer 1 is configured to fusion-splice a pair of optical fibers F1 and F2. Each of the optical fibers F1 and F2 includes a glass part G and a coated part C that covers the glass part G. The coated part C may be formed of a single layer or may be formed of a plurality of layers. The coated part C of one or more embodiments includes a first coating layer C1 and a second coating layer C2 that covers the first coating layer C1 from an outward side. The first coating layer C1 and the second coating layer C2 are formed of a resin. Further, the coated part C may include three or more coating layers.

The fusion splicer 1 may be configured to collectively fusion-splice a first optical fiber unit including the optical fiber F1 and a second optical fiber unit including the optical fiber F2. That is, the fusion splicer 1 may fusion-splice single-core optical fibers F1 and F2 to each other or may collectively fusion-splice multicore optical fiber units to each other. That is, "fusion-splicing a pair of optical fibers" includes fusion-splicing multicore optical fiber units to each other.

The fusion splicer 1 includes a device main body 2 having a box shape in an external appearance. A windproof cover 3 is provided in an upper portion of the device main body 2. The windproof cover 3 is rotatable around a rotation center 3a. As shown in FIG. 1B, when the windproof cover 3 rotates around the rotation center 3a, a splicing structure 10 that fusion-splices the optical fibers F1 and F2 is exposed. The splicing structure 10 includes a heater 2a that heats the optical fibers F1 and F2.

Hereinafter, the splicing structure 10 of one or more embodiments will be described with reference to FIG. 2. In FIG. 2 and subsequent figures, each member is shown in a simplified manner for easy understanding of the structure.

As shown in FIG. 2, the splicing structure 10 includes a pair of movable stages 11, a pair of lower clamps 12, a pair of glass holders 13, a pair of glass clamps 14, a pair of coated part clamps 15, and a pair of electrode rods 17. A direction in which the pair of movable stages 11 face each other and a direction in which the pair of electrode rods 17 face each other are perpendicular to each other.

Definition of Directions

In one or more embodiments, a direction in which the pair of movable stages 11 face each other is referred to as a left-right direction X and is represented by an X axis. Also, a direction in which the pair of electrode rods 17 face each other is referred to as a front-rear direction Y and is represented by a Y axis. A vertical direction Z perpendicular to both the left-right direction X and the front-rear direction Y is represented by a Z axis. The left-right direction X is also a direction in which the pair of optical fibers F1 and F2 extend. In the left-right direction X, a side closer to the pair of electrode rods 17 is referred to as an inward side, and a side away from the pair of electrode rods 17 is referred to as an outward side.

The splicing structure 10 has substantially a symmetrical structure in the left-right direction X with the pair of electrode rods 17 as a center.

Although not shown, the pair of electrode rods 17 are disposed at a distance in the front-rear direction Y. Each of the electrode rods 17 has a tapered shape in which an outer diameter decreases toward an inward side (a side approaching the optical fibers F1 and F2) in the front-rear direction Y. When abutting surfaces of the optical fibers F1 and F2 are disposed between the electrode rods 17 and electrical discharge is performed toward the abutting surfaces, distal ends of the optical fibers F1 and F2 can be heated and fusion-spliced. That is, the heater 2a of one or more embodiments is constituted by the pair of electrode rods 17. Further, a heater or the like may be used instead of the electrode rods 17 as the heater 2a.

The pair of movable stages 11 are disposed at a distance in the left-right direction X and are attached to the device main body 2. Each of the pair of movable stages 11 is movable in the left-right direction X with respect to the device main body 2. As shown in FIG. 2, the pair of movable stages 11 are disposed to sandwich the electrode rods 17 therebetween when viewed from the front-rear direction Y. That is, the movable stages 11 can move forward and backward with respect to the electrode rods 17. A power source (not shown, motor or the like) that drives the movable stages 11 is provided in the device main body 2.

The pair of lower clamps 12 are formed in a plate shape and are respectively positioned on an upper side of the movable stages 11. The lower clamps 12 are attachable to and detachable from the movable stages 11. The pair of coated part clamps 15 are positioned above the lower clamps 12. The lower clamp 12 and the coated part clamp 15 are fixed to the movable stage 11. Therefore, when the movable stage 11 moves in the left-right direction X, the lower clamp 12 and the coated part clamp 15 also move in the left-right direction X.

The glass clamp 14 is positioned above the glass holder 13. The glass clamp 14 is configured to open and close an upper surface of the glass holder 13 in conjunction with an opening and closing operation of the windproof cover 3. In one or more embodiments, the glass clamp 14 is attached to an inner surface of the windproof cover 3. Also, a spring that applies a force to the glass clamp 14 downward is provided inside each of the pair of glass clamps 14. With this configuration, when the windproof cover 3 is closed, the glass clamp 14 presses the glass part G of the optical fiber F1 or F2 due to the force applied thereto by the spring. Also, since the glass holder 13 is positioned below the glass clamp 14, the glass part G of the optical fiber F1 or F2 is sandwiched between the glass clamp 14 and the glass holder 13 by the biasing force generated by the spring. On the other hand, when the windproof cover 3 is opened, the glass clamp 14 is also separated upward from the glass part G. As described above, the glass clamp 14 can switch between a state in which the glass part G is held and a state in which the glass part G is not held in conjunction with the opening and closing operation of the windproof cover 3.

As shown in FIG. 2, the glass holder 13 is positioned between the electrode rod 17 and the lower clamp 12 when viewed from the front-rear direction Y. A V-shaped groove 13a that opens upward is formed on the upper surface of the glass holder 13. The groove 13a extends in the left-right direction X. Relative positions of the glass parts G are determined when the glass parts G of the optical fibers F1 and F2 are placed on the respective grooves 13a of the pair of glass holders 13. Further, a shape of the groove 13a is not limited to the V-shape, and any shape may be used as long as a position of the glass part G can be determined thereby. For example, the groove 13a may be U-shaped or trapezoidal. A material of the glass holder 13 is a material capable of withstanding electrical discharge heating such as, for example, a ceramic.

The coated part clamp 15 is provided to be rotatable with respect to the lower clamp 12. The coated part clamp 15 can open and close an upper surface of the lower clamp 12. The coated part clamp 15 can hold the coated part C of the optical fiber F1 or F2 between the coated part clamp 15 and the lower clamp 12. Also, the coated part clamp 15 can switch between a state in which the optical fiber F1 or F2 is held and a state in which it is not held by opening and closing the upper surface of the lower clamp 12.

Figure 3A:
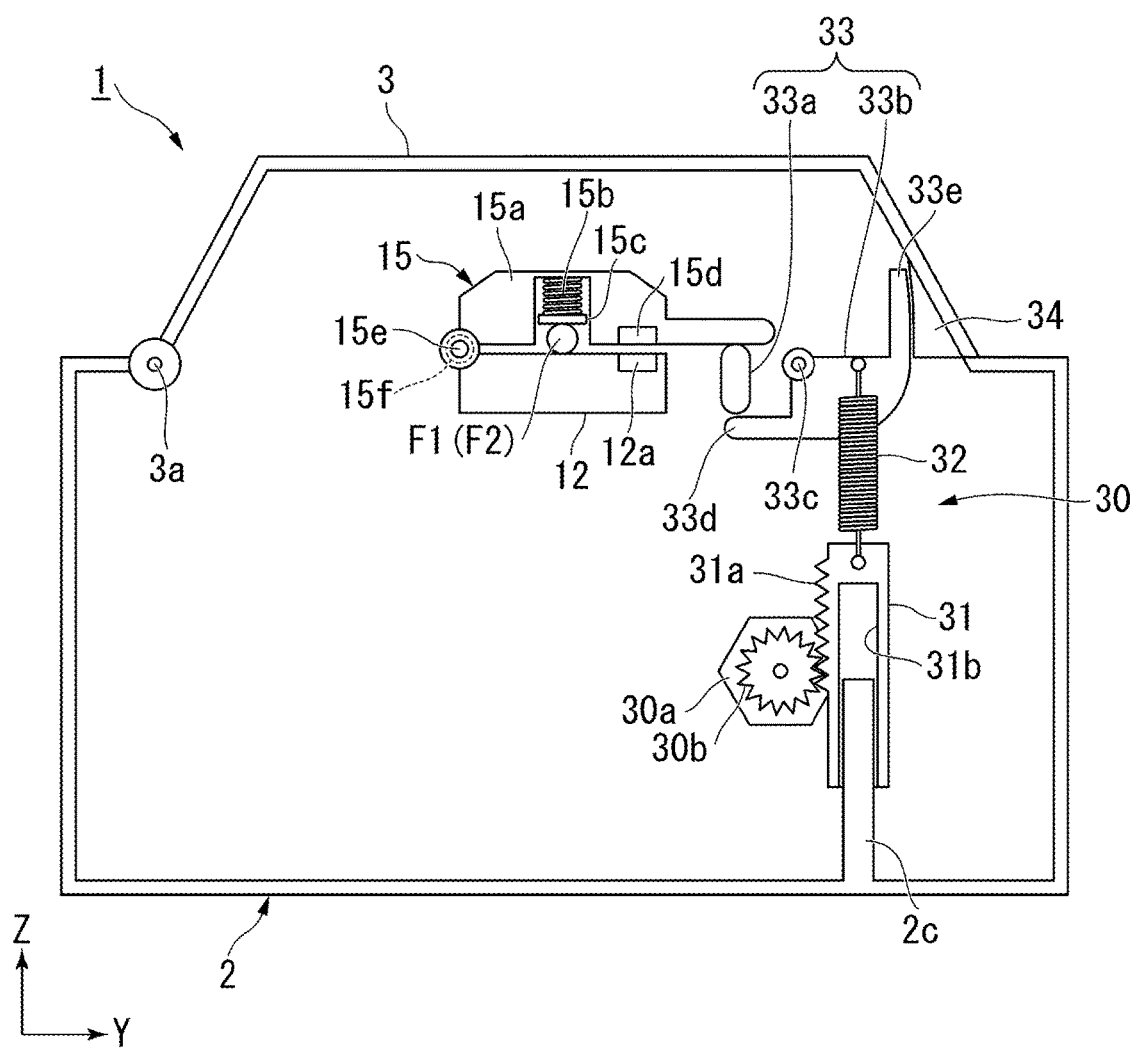
FIG. 3A is a schematic view of a retreat mechanism provided in the fusion splicer of one or more embodiments from a left-right direction.

As shown in FIG. 3A, the coated part clamp 15 includes a lid member 15a, a compression spring 15b, and a pressing piece 15c. The lid member 15a is rotatable around a rotating shaft 15e. The compression spring 15b and the pressing piece 15c are disposed on an inward side of the lid member 15a. The pressing piece 15c comes into contact with the optical fiber F1 or F2. The compression spring 15b applies a downward biasing force to the pressing piece 15c. Therefore, in a state in which the coated part clamp 15 is closed, the pressing piece 15c presses the optical fiber F1 or F2 with a predetermined force due to the compression spring 15b.

A magnet 12a is provided in the lower clamp 12, and an attracted member 15d (such as an iron material) that is magnetically attracted to the magnet 12a is provided in the lid member 15a of the coated part clamp 15. Therefore, in a state in which the coated part clamp 15 is close to the upper surface of the lower clamp 12, a downward force (magnetic force) acts on the coated part clamp 15. The magnetic force serves as a force (closing force) acting to close the coated part clamp 15. When the pressing piece 15c presses the optical fiber F1 or F2, the lid member 15a receives an upward reaction force, but the magnetic force of the magnet 12a is set to have a strength such that the lid member 15a is not opened by the reaction force.

A torsion coil spring 15f is disposed near the rotating shaft 15e. The torsion coil spring 15f applies a moment about the rotating shaft 15e in a direction to open the coated part clamp 15 to the coated part clamp 15. However, the force (opening force) by which the torsion coil spring 15f tries to open the coated part clamp 15 is smaller than the magnetic force (closing force) in a state in which the magnet 12a and the attracted member 15d are close to each other. Therefore, in a state in which the magnet 12a and the attracted member 15d are close to each other, the closing force overcomes the opening force of the torsion coil spring 15f, and the closed state of the coated part clamp 15 is maintained. Here, as shown in FIG. 3A, the fusion splicer 1 of one or more embodiments includes a retreat mechanism 30 which causes the coated part clamp 15 to retreat from the lower clamp 12.

The retreat mechanism 30 includes a power source 30a, a gear member 31, an elastic member 32, a transmission part 33 (rotating member 33b), and a restricting part 34.

The power source 30a is a motor or the like and includes a pinion gear 30b. The gear member 31 (rack member) includes a tooth part 31a and a sliding part 31b. The tooth part 31a is formed in the vertical direction Z and meshes with the pinion gear 30b of the power source 30a. The sliding part 31b slides with respect to a slide guide 2c of the device main body 2. In one or more embodiments, the sliding part 31b is a recessed part extending in the vertical direction Z, and the slide guide 2c is fitted in the recessed part. When the sliding part 31b slides with respect to the slide guide 2c, the gear member 31 vertically moves with respect to the device main body 2. Further, shapes of the sliding part 31b and the slide guide 2c can be appropriately changed as long as they configure a structure in which the gear member 31 vertically moves with respect to the device main body 2

The transmission part 33 of one or more embodiments is constituted by a rotating member 33b and a pin 33a.

The rotating member 33b is rotatable around a rotation center 33c. The rotating member 33b includes a first arm 33d and a second arm 33e. The first arm 33d is close to or in contact with a lower end of the pin 33a. The second arm 33e is close to or in contact with the restricting part 34. The pin 33a is slidably movable in the vertical direction Z. Sliding of the pin 33a is guided by a guide member (not shown).

The elastic member 32 is elastically deformed by power received from the power source 30a. Due to the elastically deformation of the elastic member 32, the elastic member 32 stores elastic energy (restorative force). The elastic member 32 is deformed to be restored when restriction on rotation of the rotating member 33b is released by the restricting part 34. The elastic member 32 rotates the rotating member 33b by the restorative force in accordance with restoring deformation of the elastic member 32. Although the elastic member 32 of one or more embodiments is a tension spring, other members having elasticity (such as a rubber) may be used as the elastic member 32. A first end (lower end) of the elastic member 32 is locked to the gear member 31, and a second end (upper end) thereof is locked to a portion between the rotation center 33c and the second arm 33e of the rotating member 33b.

Figure 3B:
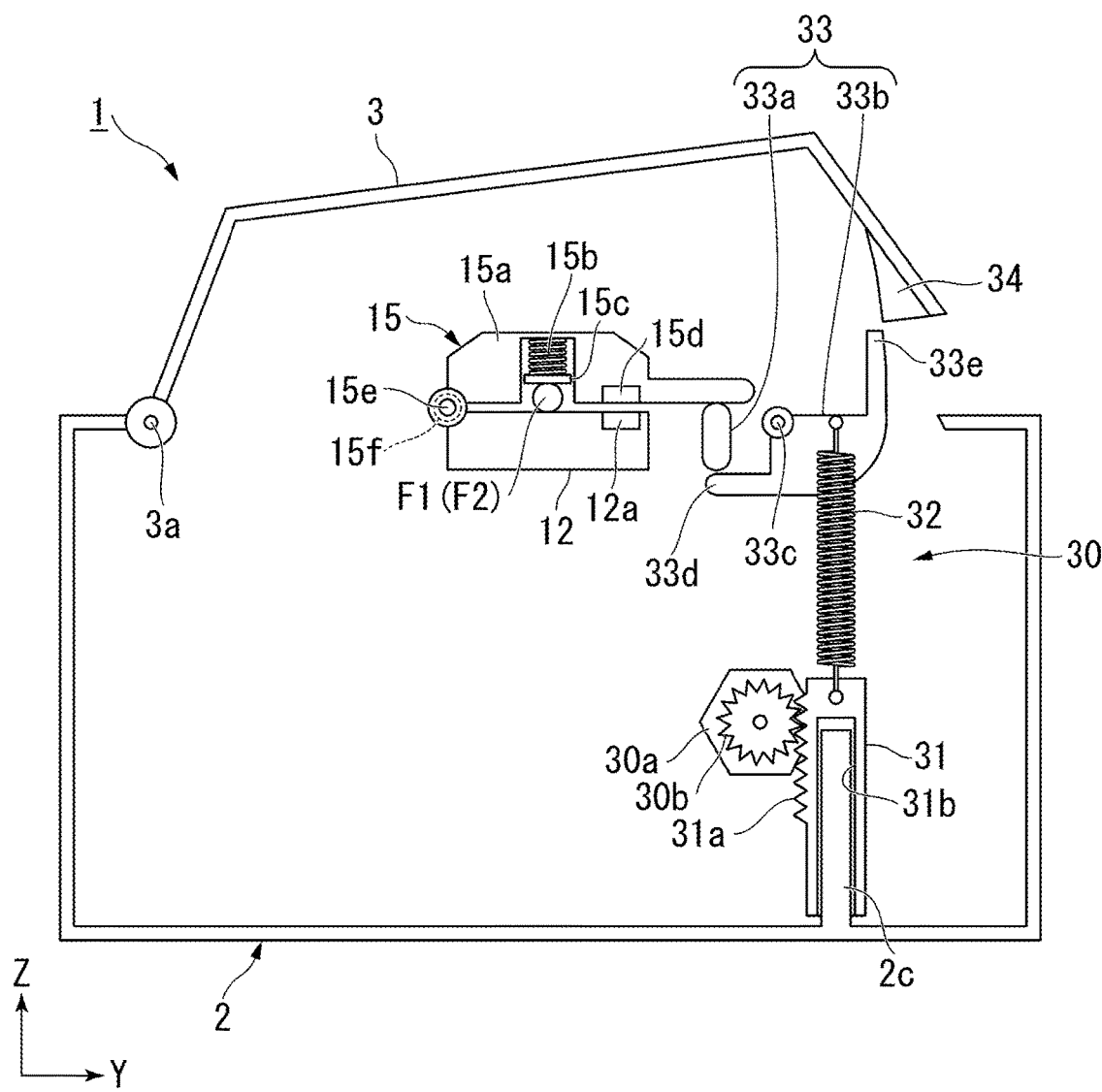
FIG. 3B is a schematic view showing a state in which the windproof cover of FIG. 3A is opened.

The restricting part 34 is fixed to the windproof cover 3. The restricting part 34 is disposed to sandwich the transmission part 33 between the restricting part 34 and the coated part clamp 15 in the front-rear direction Y. In a state in which the windproof cover 3 is closed, rotation of the rotating member 33b is restricted when the restricting part 34 comes into contact with the second arm 33e. On the other hand, as shown in FIG. 3B, in a state in which the windproof cover 3 is open, since the restricting part 34 retreats from the second arm 33e, rotation of the rotating member 33b is allowed. That is, the restricting part 34 restricts rotation of the rotating member 33b in a state in which the windproof cover 3 is closed and releases the restriction when the windproof cover 3 is open. In other words, the restricting part 34 restricts rotation of the rotating member 33b while the elastic member 32 stores elastic energy (while the elastic member 32 is elastically deformed by power received from the power source 30a). The restricting part 34 releases the elastic energy stored in the elastic member 32 in conjunction with an opening operation of the windproof cover 3, thereby releases restriction on rotation of the rotating member 33b. According to the release of the restriction, the restricting part 34 causes the elastic member 32 to be deformed and restored and causes the rotating member 33b to rotate by the restorative force generated from the elastic member 32.

Next, an operation of the fusion splicer 1 configured as described above will be described.

At the time of fusing-splicing the optical fibers F1 and F2 using the fusion splicer 1, a state in which the windproof cover 3 is open and the coated part clamp 15 is open is set. In this state, the optical fibers F1 and F2 are placed on the lower clamps 12 and the glass holders 13. More specifically, the coated parts C of the optical fibers F1 and F2 are placed on the lower clamps 12, and the glass parts G are placed in the grooves 13a of the glass holders 13. Further, the optical fibers F1 and F2 are each put into a state in which a portion of the coated part C is removed in advance and the glass part G is exposed.

Next, the windproof cover 3 and the coated part clamp 15 are closed. Therefore, the state shown in FIG. 3A is obtained.

Next, the movable stages 11 are moved in the left-right direction X so that the glass parts G of the optical fibers F1 and F2 are made to abut against each other, and electric power is supplied to the heaters 2a (the electrode rods 17). Therefore, the glass parts G of the optical fibers F1 and F2 are melted, integrated, and fusion-spliced.

Here, in one or more embodiments, the power source 30a is driven after the windproof cover 3 and the coated part clamp 15 are closed. When the power source 30a is driven to rotate the pinion gear 30b, the gear member 31 moves downward, and the elastic member 32 is elastically deformed to extend downward. At this time, rotation of the rotating member 33b around the rotation center 33c is restricted by the restricting part 34. Therefore, the elastic member 32 continues to be pulled downward while the rotating member 33b does not rotate, and elastic energy is gradually stored in the elastic member 32. The elastic energy stored in the elastic member 32 is used to open the coated part clamps 15.

Figure 3C:
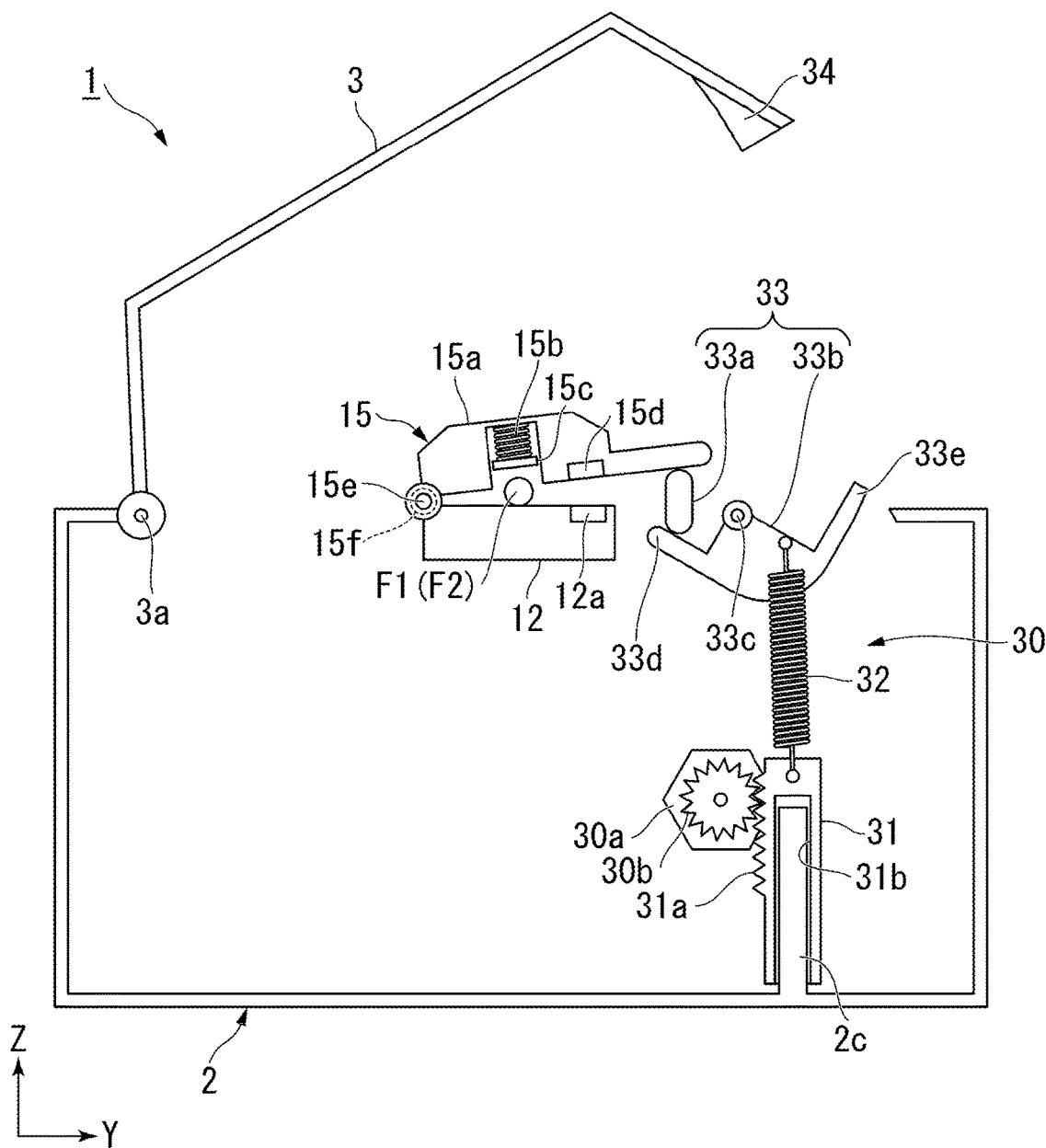
FIG. 3C is a schematic view showing a state in which a transmission part of FIG. 3B is displaced.

When the windproof cover 3 is opened manually or automatically after the fusion splicing is completed, the restricting part 34 retreats from the rotating member 33b and the rotating member 33b reaches a state in which it can rotate as shown in FIG. 3B. Therefore, the elastic energy stored in the elastic member 32 is released in a short period of time, and the rotating member 33b vigorously rotates around the rotation center 33c as shown in FIG. 3C. Then, the first arm 33d of the rotating member 33b pushes the pin 33a upward. Also, since the pin 33a pushes the lid member 15a of the coated part clamp 15 upward, the lid member 15a rotates around the rotating shaft 15e, and a distance between the attracted member 15d and the magnet 12a increases.

Since a magnetic force decreases as the magnet 12a and the attracted member 15d move away from each other, when the coated part clamp 15 is opened to a certain extent, an opening force of the torsion coil spring 15f overcomes a closing force, and the coated part clamp 15 is opened.

Figure 3D:
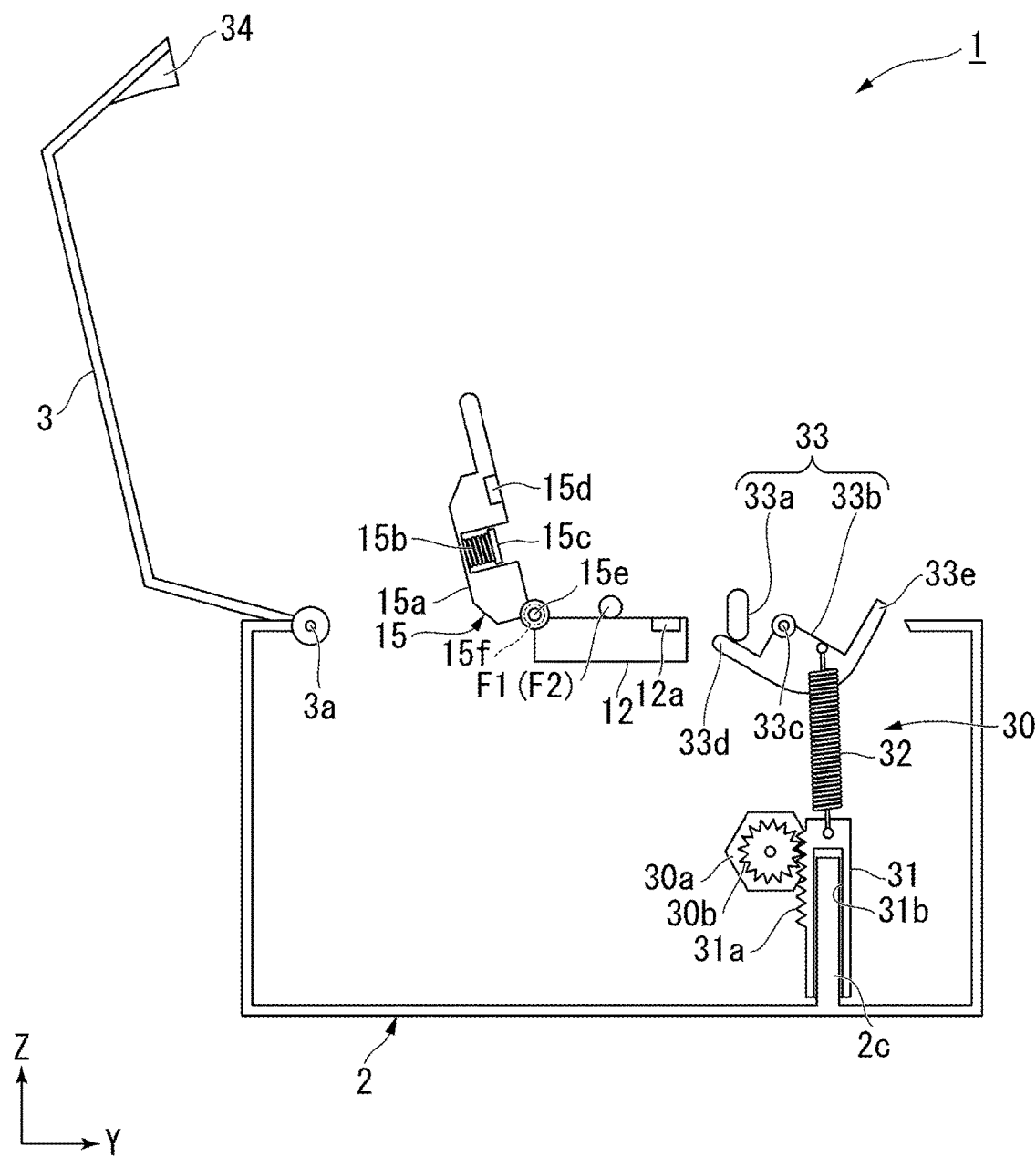
FIG. 3D is a schematic view showing a state in which the windproof cover and a coated part clamp of FIG. 3C are opened.

Thereafter, when the windproof cover 3 is released as shown in FIG. 3D, a user can pull out the fusion-spliced optical fibers F1 and F2. After the windproof cover 3 is opened, an operation of returning the gear member 31 to the position shown in FIG. 3A may be performed by rotating the power source 30a in a reverse direction and moving the gear member 31 upward. Alternatively, when the coated part clamp 15 is closed, since the rotating member 33b rotates to pull the elastic member 32 upward, the gear member 31 may be returned to the position shown in FIG. 3A using the pulling-up force.

When the fusion splicing is performed again, the operation returns to the state shown in FIG. 3A by setting the optical fibers F1 and F2 and closing the coated part clamps 15 and the windproof cover 3.

As described above, the fusion splicer 1 of one or more embodiments includes the heater 2a which heats the glass parts G of the optical fibers F1 and F2, the lower clamp 12 on which the coated part C of the optical fiber F1 or F2 is placed, the coated part clamp 15 which sandwiches the optical fiber F1 or F2 between the coated part clamp 15 and the lower clamp 12, the windproof cover 3 which covers the heater 2a and the coated part clamp 15, and the retreat mechanism 30 which causes the coated part clamp 15 to retreat from the lower clamp 12. The retreat mechanism 30 includes the power source 30a, the elastic member 32 that is elastically deformed by power received from the power source 30a, the transmission part 33 that pushes the coated part clamp 15 upward due to an elastic force received from the elastic member 32, and the restricting part 34 which restricts displacement of the transmission part 33 in a state in which the windproof cover 3 is closed. Then, the restricting part 34 releases restriction on displacement of the transmission part 33 in conjunction with an opening operation of the windproof cover 3.

According to such a configuration, the elastic member 32 can be elastically deformed by driving the power source 30a after the optical fibers F1 and F2 are set and the windproof cover 3 and the coated part clamp 15 are closed. Then, since restriction on displacement of the transmission part 33 is released in conjunction with an opening operation of the windproof cover 3 after the fusion splicing is completed, the transmission part 33 can be displaced and the coated part clamp 15 can be pushed upward by the elastic force received from the elastic member 32. As described above, power of the power source 30a is not simply transmitted to the coated part clamp 15 via a gear or the like, but the power is temporarily stored in the elastic member 32 as elastic energy and then transmitted to the coated part clamp 15, and thus an operation time at the time of opening the coated part clamp 15 can be shortened. Also, when power obtained from the power source 30a is stored in the elastic member 32 using a time while the fusion splicing or the like is performed and then is released in a short period of time, the coated part clamp 15 can be opened by overcoming a closing force of the coated part clamp 15 while using a low-output power source 30a.

Also, the transmission part 33 of one or more embodiments includes the rotating member 33b which is rotatable around the rotation center 33c, and the pin 33a positioned between the coated part clamp 15 and the rotating member 33b and slidably movable in the vertical direction Z. When the rotating member 33b rotates due to an elastic force received from the elastic member 32, the pin 33a slides upward and pushes the coated part clamp 15 upward. As described above, when rotational displacement of the rotating member 33b is converted into upward displacement of the pin 33a, the coated part clamp 15 can be more reliably opened. Also, when a distance between the rotation center 33c and the lower end of the pin 33a is made smaller than a distance between the rotation center 33c and an upper end of the elastic member 32, a force by which the pin 33a moves upward can also be amplified by the lever ratio.

Furthermore, as shown in FIGS. 3A to 3D, according to the action of the restricting part 34 and the rotating member 33b, a state of the windproof cover 3 is gradually changed from a closed state to an open state (release state). In accordance with the foregoing change in state of the windproof cover 3, the glass clamps 14 attached to the inner surface of the windproof cover 3 automatically moves upward separately from the optical fibers F1 and F2, and the coated part clamps 15 also automatically opens. As the windproof cover 3 rotates around the rotation center 3a and the coated part clamps 15 rotate around the rotating shaft 15e, the windproof cover 3, the glass clamps 14, and the coated part clamps 15 each move to a position apart from an upper space of the lower clamp 12. Therefore, a state in which there no member covering over the optical fibers F1 and F2 from above is obtained, and a state in which an upper space of the optical fibers F1 and F2 is automatically released is obtained. Since the state in which there no member covering over the optical fibers F1 and F2 from above is obtained, a user can easily remove the fusion-spliced optical fibers F1 and F2. Particularly, the user is not necessary to carry out an operation of individually opening the glass clamps 14 and the coated part clamps as an operation different from an operation of opening the windproof cover 3, and it is possible to easily remove the optical fibers F1 and F2 that were fusion-spliced to each other only by carrying out the operation of opening the windproof cover 3. Consequently, it is possible to reduce the number of operation steps carried out by the user. Accordingly, it is possible to achieve the fusion splicer that contributes to reduction in the number of operation steps.

Second Example

Next, one or more embodiments will be described, but basic configurations are the same as those in the first example. Therefore, constituents which are the same are denoted by the same reference numerals, a description thereof will be omitted, and only different points will be described.

Figure 4:
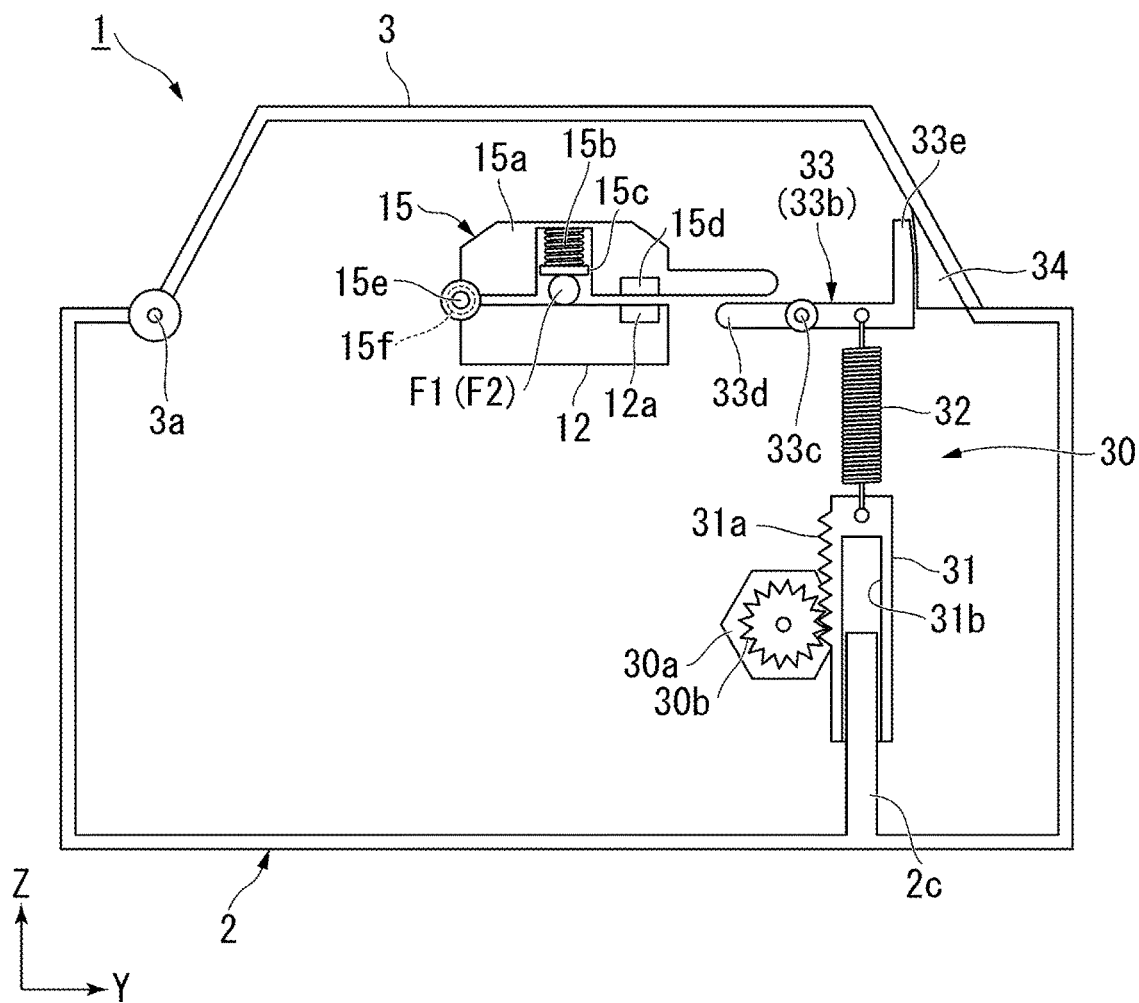
FIG. 4 is a schematic view of a retreat mechanism provided in a fusion splicer of one or more embodiments from a left-right direction.

In one or more embodiments, a configuration of a transmission part 33 is different from that in the first example. As shown in FIG. 4, the transmission part 33 of one or more embodiments includes a rotating member 33b but does not include the pin 33a (see FIG. 3A). Also, a shape of the rotating member 33b is different from that of the first example. The rotating member 33b of one or more embodiments is formed in an L shape when viewed from a left-right direction X. Although not shown, when the rotating member 33b is rotated by an elastic force received from an elastic member 32, a first arm 33d of the rotating member 33b directly pushes the coated part clamp 15 upward. Even with such a configuration, an operation time at the time of opening a coated part clamp 15 can be shortened while using a low-output power source 30a.

Third Example

Next, one or more embodiments will be described, but basic configurations are the same as those in the second example. Therefore, constituents which are the same are denoted by the same reference numerals, a description thereof will be omitted, and only different points will be described.

Figure 5:
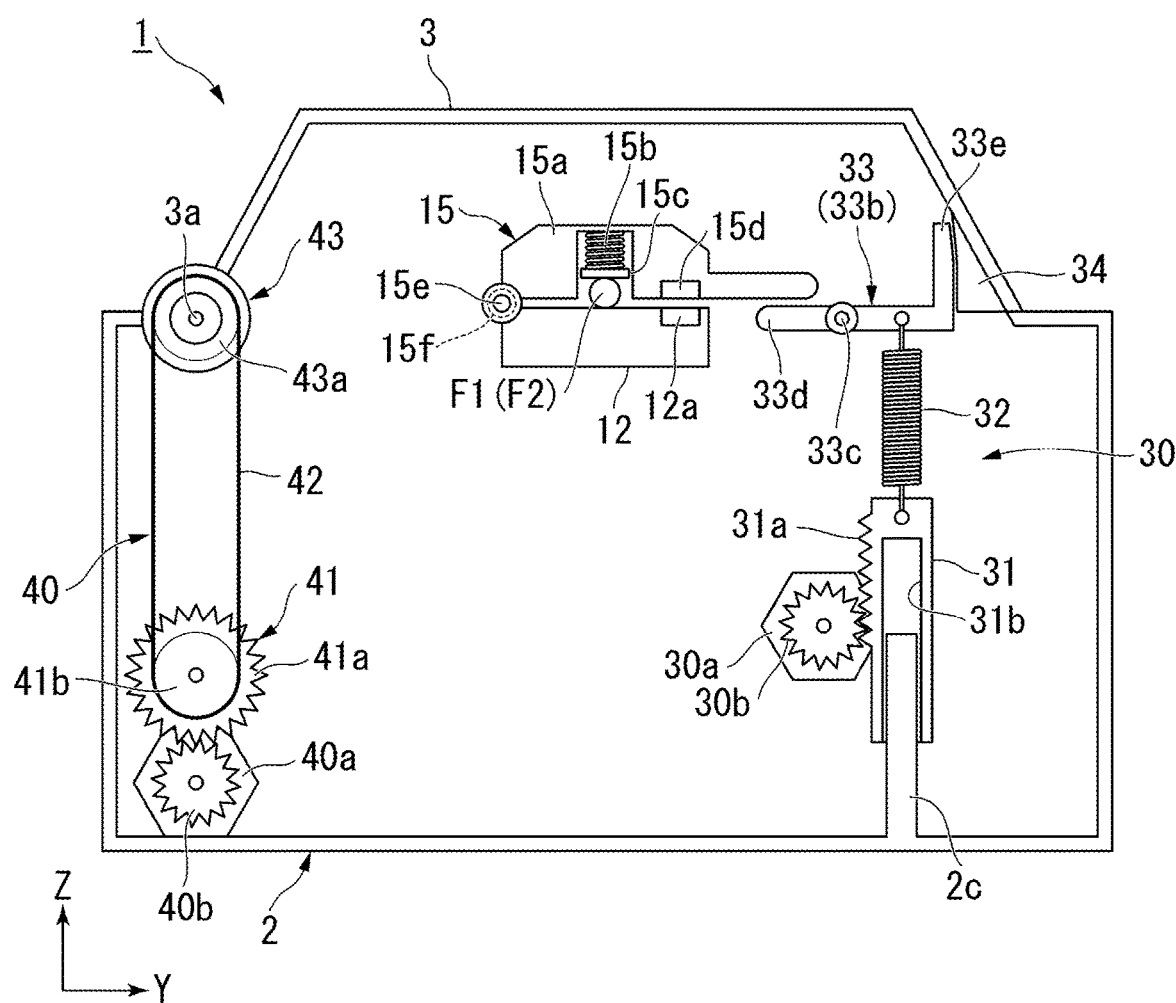
FIG. 5 is a schematic view of a retreat mechanism and an opening/closing mechanism provided in a fusion splicer of one or more embodiments from a left-right direction.

As shown in FIG. 5, a fusion splicer 1 of one or more embodiments includes an opening/closing mechanism 40 for automatically opening and closing a windproof cover 3. The opening/closing mechanism 40 includes a cover driver 40a, a geared pulley 41, a belt 42, and a connecting pulley 43. The cover driver 40a is a motor or the like. The cover driver 40a includes a pinion gear 40b. The geared pulley 41 includes a gear part 41a and a pulley part 41b. The gear part 41a meshes with the pinion gear 40b of the cover driver 40a, and one end (lower end) of the belt 42 is wrapped around the pulley part 41b. The belt 42 may be a timing belt, and the pulley part 41b may be a timing pulley.

The other end (upper end) of the belt 42 is wrapped around a pulley part 43a of the connecting pulley 43. Also, the connecting pulley 43 is fixed to the windproof cover 3. With this configuration, the connecting pulley 43 connects the belt 42 and the windproof cover 3, and when the cover driver 40a is driven, the windproof cover 3 rotates around a rotation center 3a.

According to one or more embodiments, the windproof cover 3 is automatically opened by driving of the opening/closing mechanism 40.

Then, a restricting part 34 fixed to the windproof cover 3 releases restriction on displacement of the transmission part 33 in conjunction with an opening operation of the windproof cover 3, and the coated part clamp 15 is opened by the displacement of the transmission part 33. Accordingly, the windproof cover 3 and the coated part clamp 15 are automatically opened, and thus operability can be further improved from a user's point of view.

Further, the opening/closing mechanism 40 of one or more embodiments is an example, and other configurations may also be employed as long as the windproof cover 3 can be automatically opened and closed.

Fourth Example

Next, one or more embodiments will be described, but basic configurations are the same as those in the third example. Therefore, constituents which are the same are denoted by the same reference numerals, description thereof will be omitted, and only different points will be described.

Figure 6:
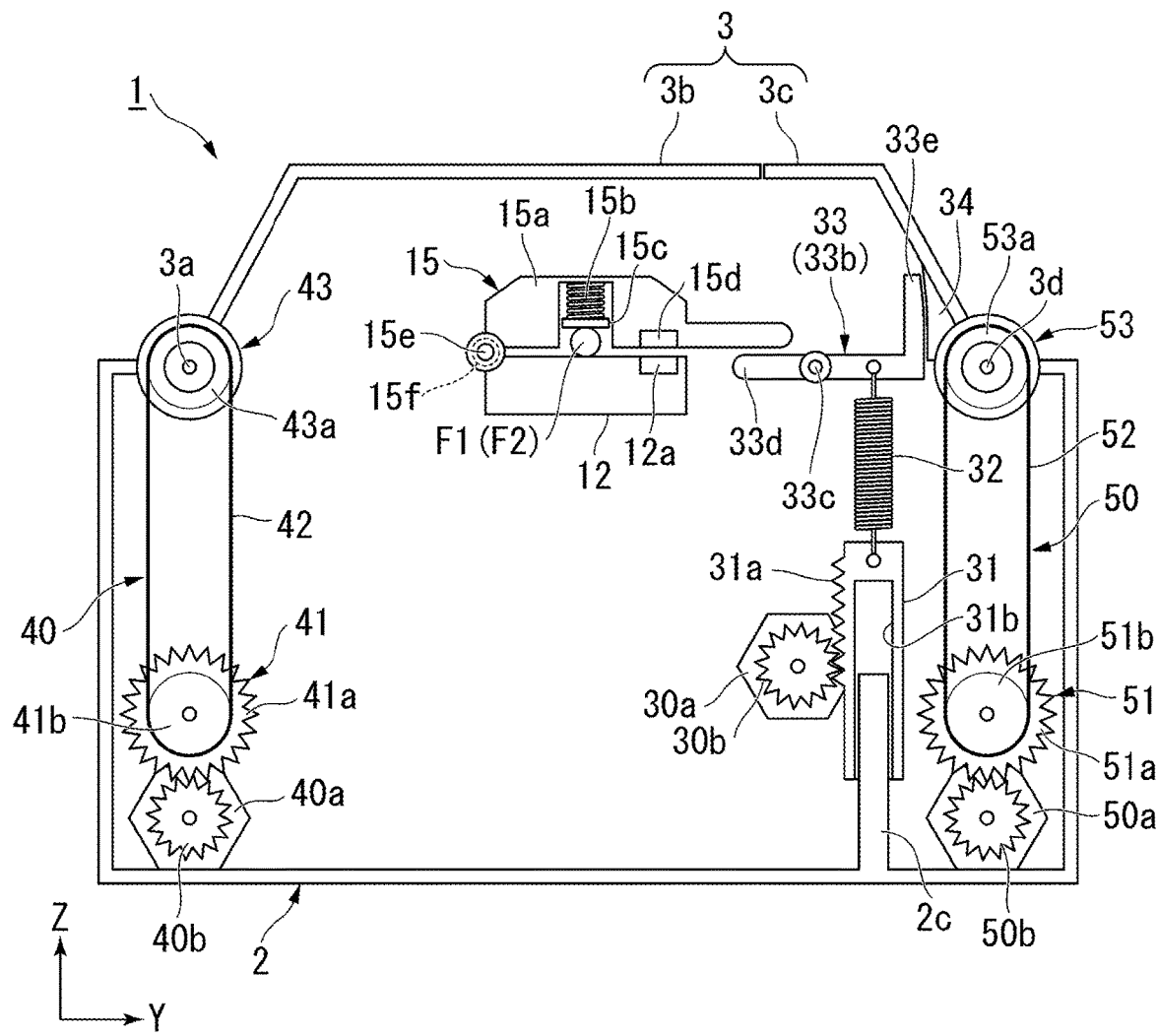
FIG. 6 is a schematic view of a retreat mechanism and an opening/closing mechanism provided in a fusion splicer of one or more embodiments from a left-right direction.

As shown in FIG. 6, a fusion splicer 1 of one or more embodiments includes a second opening/closing mechanism 50. Also, the windproof cover 3 is constituted by a first segmented member 3b driven by an opening/closing mechanism 40 and a second segmented member 3c driven by the second opening/closing mechanism 50. The first segmented member 3b is rotatable around a rotation center 3a, and the second segmented member 3c is rotatable around a second rotation center 3d.

The second opening/closing mechanism 50 includes a second cover driver 50a, a second geared pulley 51, a second belt 52, and a second connecting pulley 53. The second cover driver 50a is a motor or the like. The second cover driver 50a includes a second pinion gear 50b. The second geared pulley 51 includes a second gear part 51a and a second pulley part 51b. The second gear part 51a meshes with the second pinion gear 50b, and one end (lower end) of the second belt 52 is wrapped around the second pulley part 51b. The second belt 52 may be a timing belt, and the second pulley part 51b may be a timing pulley.

The other end (upper end) of the second belt 52 is wrapped around a pulley part 53a of the second connecting pulley 53. Also, the second connecting pulley 53 is fixed to the second segmented member 3c of the windproof cover 3. With this configuration, the second connecting pulley 53 connects the second belt 52 and the second segmented member 3c, and when the second cover driver 50a is driven, the second segmented member 3c rotates around the second rotation center 3d.

According to one or more embodiments, the second segmented member 3c is automatically opened by driving of the second opening/closing mechanism 50. Then, a restricting part 34 fixed to the second segmented member 3c releases restriction on displacement of a transmission part 33 in conjunction with an opening operation of the second segmented member 3c, and a coated part clamp 15 is opened by the displacement of the transmission part 33. Even with such a configuration, operability can be improved.

Fifth Example

Next, one or more embodiments will be described, but basic configurations are the same as those in the fourth example. Therefore, constituents which are the same are denoted by the same reference numerals, description thereof will be omitted, and only different points will be described.

Figure 7A:
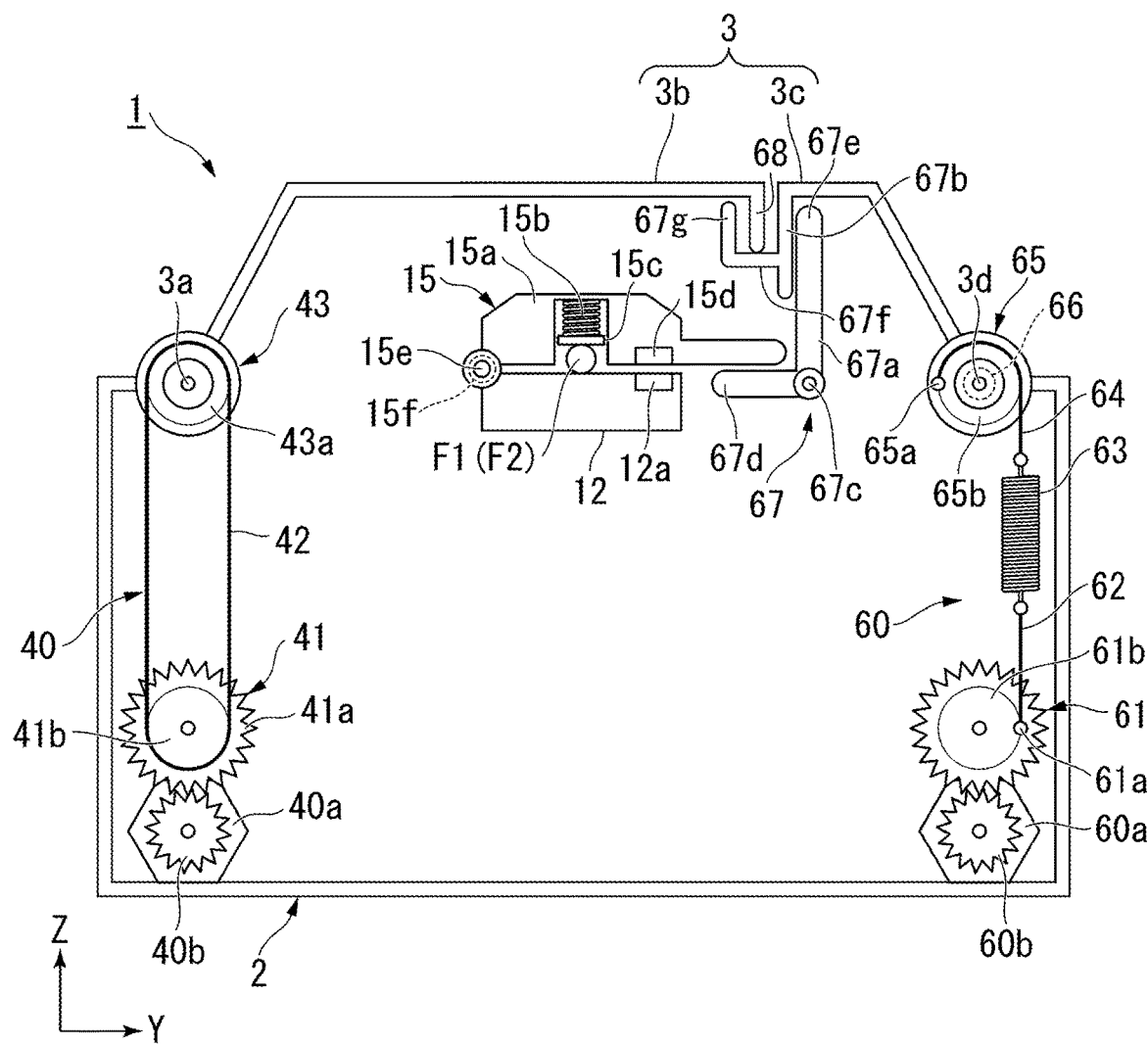
FIG. 7A is a schematic view of a retreat mechanism and an opening/closing mechanism provided in a fusion splicer of one or more embodiments from a left-right direction.

As shown in FIG. 7A, a fusion splicer 1 of one or more embodiments includes a retreat mechanism 60. The retreat mechanism 60 has both functions of the second opening/closing mechanism 50 and a retreat mechanism 30 in the fourth example.

The retreat mechanism 60 includes a power source 60a, a gear member 61, a first wire 62, an elastic member 63, a second wire 64, a rotating pulley 65, a torsion coil spring 66, a transmission part 67, and a restricting part 68.

The power source 60a is a motor or the like and includes a pinion gear 60b. The gear member 61 meshes with the pinion gear 60b of the power source 60a. A locking part 61a is formed on a side surface of the gear member 61, and a lower end of the first wire 62 is locked to the locking part 61a. Also, the gear member 61 has a first winding surface 61b, and when the gear member 61 rotates, the first wire 62 is wound on the first winding surface 61b. An upper end of the first wire 62 is fixed to a lower end of the elastic member 63.

The elastic member 63 is elastically deformed by power received from the power source 60a. Although the elastic member 63 of one or more embodiments is a tension spring, other members having elasticity (such as a rubber) may be used as the elastic member 63. An upper end of the elastic member 63 is fixed to one end of the second wire 64. The rotating pulley 65 is fixed to a second segmented member 3c of a windproof cover 3. A locking part 65a is formed on a side surface of the rotating pulley 65, and the other end of the second wire 64 is locked to the locking part 65a. Also, the rotating pulley 65 has a second winding surface 65b, and a portion of the second wire 64 is wound on the second winding surface 65b.

The torsion coil spring 66 is positioned near a central axis of the rotating pulley 65 and applies a moment in a direction to close the second segmented member 3c with respect to the rotating pulley 65. The moment of the torsion coil spring 66 is transmitted to the second segmented member 3c via the rotating pulley 65. However, in a state in which a first segmented member 3b is closed, since rotation of the second segmented member 3c is restricted by the restricting part 68, a state in which the second segmented member 3c is closed is maintained.

The transmission part 67 of one or more embodiments is constituted by a rotating member 67a and the second segmented member 3c. The rotating member 67a is rotatable around a rotation center 67c. The rotating member 67a is formed in substantially an L shape when viewed from a left-right direction X and includes a first arm 67d and a second arm 67e. The first arm 67d is in contact with or close to a coated part clamp 15 from below. The second arm 67e is in contact with or close to an interlocking part 67b formed in the second segmented member 3c.

The interlocking part 67b extends downward from the second segmented member 3c. Also, a restricted part 67f is formed in the second segmented member 3c. The restricted part 67f protrudes in a front-rear direction Y from the interlocking part 67b. Further, a protrusion 67g that protrudes upward is formed at a distal end portion of the restricted part 67f in the front-rear direction Y. The restricted part 67f is in contact with or close to the restricting part 68 from below. The restricting part 68 is sandwiched between the protrusion 67g and the interlocking part 67b in the front-rear direction Y.

The restricting part 68 protrudes downward from the first segmented member 3b and is fixed to the first segmented member 3b. In a state in which the first segmented member 3b and the second segmented member 3c are closed, the restricting part 68 comes into contact with the restricted part 67f from above, and thereby rotation of the second segmented member 3c around a second rotation center 3d is restricted.

Next, an operation of the fusion splicer 1 of one or more embodiments will be described.

When the optical fibers F1 and F2 are set and the coated part clamps 15, the first segmented member 3b, and the second segmented member 3c are closed, the state shown in FIG. 7A is obtained. In one or more embodiments, the power source 60a is driven after the first segmented member 3b and the second segmented member 3c are closed. When the power source 60a is driven, the gear member 61 rotates and the first wire 62 is wound on the first winding surface 61b. Therefore, the elastic member 63 and the second wire 64 are pulled downward, and a rotational force acts on the rotating pulley 65 in a direction to open the second segmented member 3c.

Figure 7B:
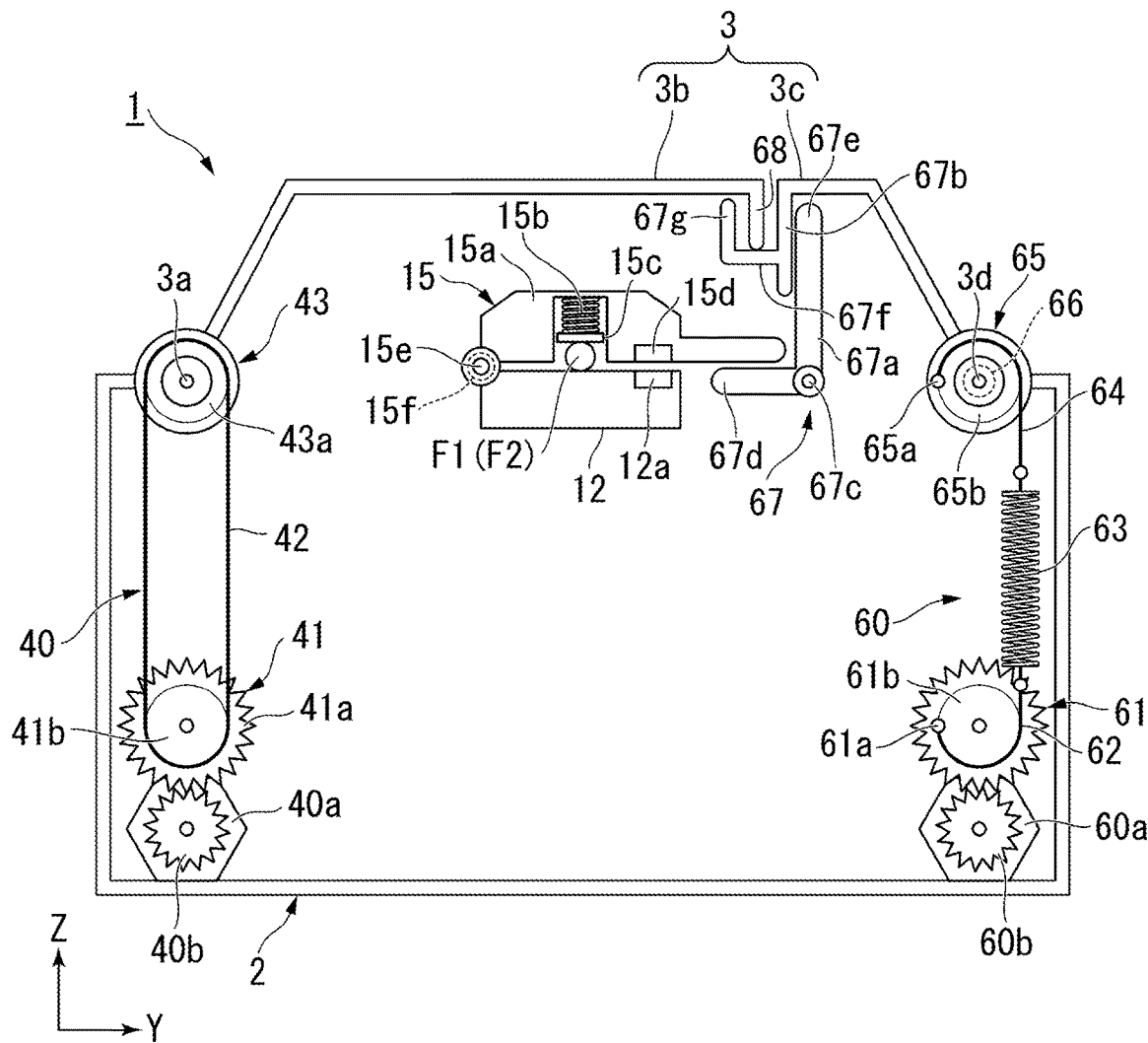
FIG. 7B is a schematic view showing a state in which an elastic member of FIG. 7A is elastically deformed.

Since the rotating pulley 65 is connected to the second segmented member 3c, the second segmented member 3c also tries to open, but rotation of the second segmented member 3c is restricted by the restricting part 68. Therefore, as shown in FIG. 7B, the elastic member 63 continues to be pulled downward while the second segmented member 3c and the rotating pulley 65 do not rotate and the rotating member 67a does not rotate, and elastic energy is gradually stored in the elastic member 63.

Figure 7C:
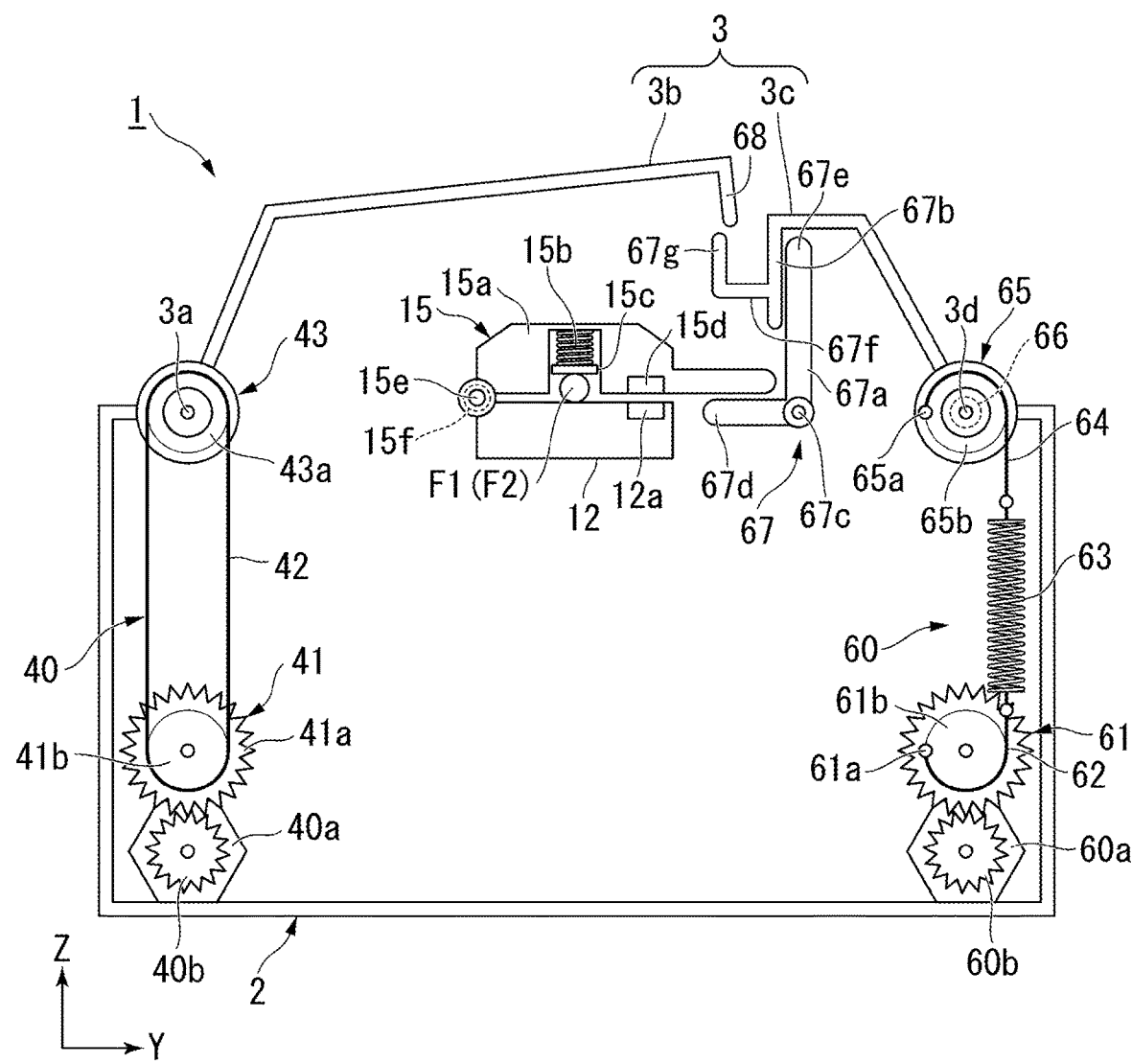
FIG. 7C is a schematic view showing a state in which a first segmented member of FIG. 7B is opened.
Figure 7D:
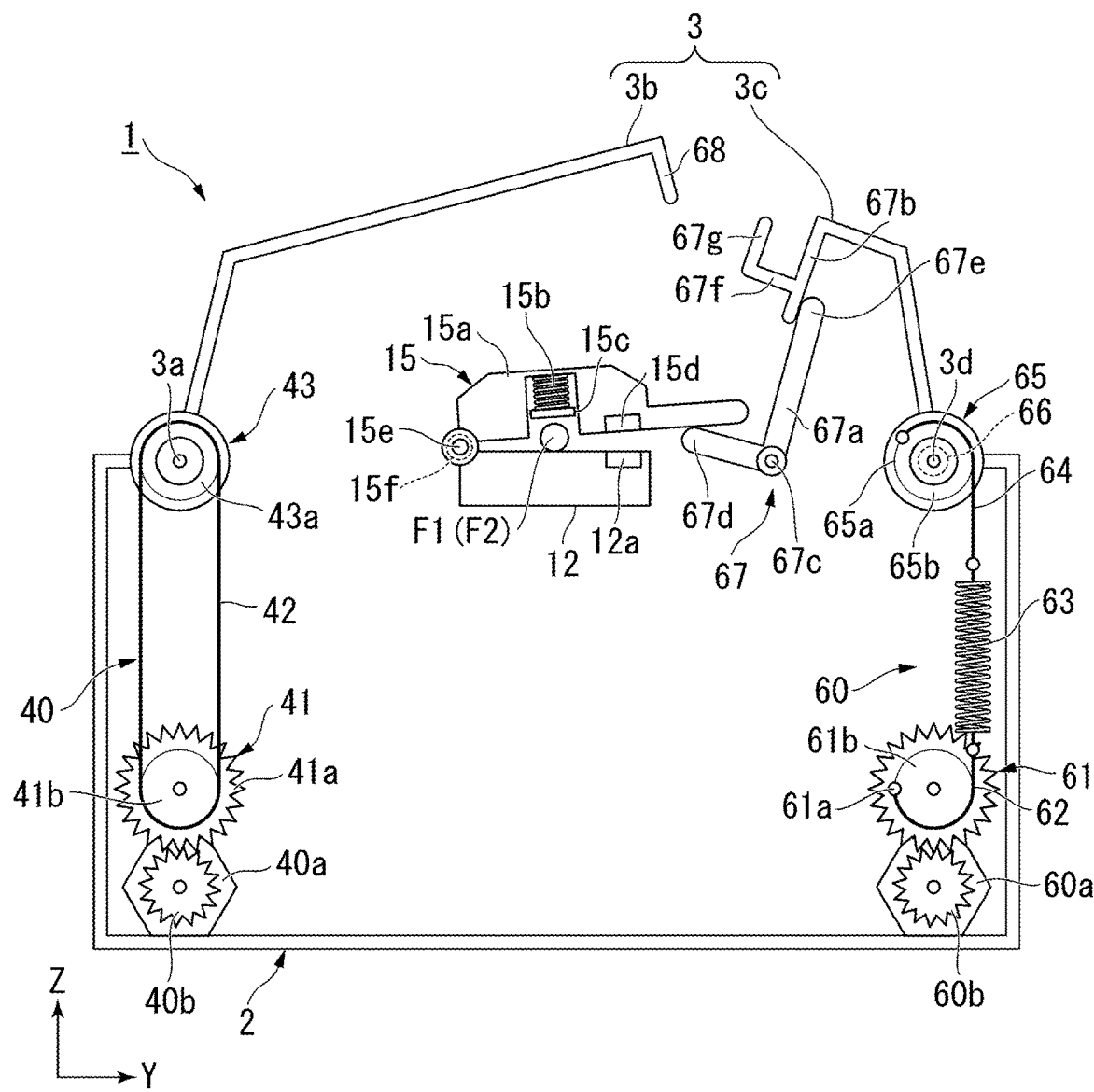
FIG. 7D is a schematic view showing a state in which a second segmented member and a coated part clamp of FIG. 7C are opened.

After the fusion splicing is completed, when a cover driver 40a is driven and the first segmented member 3b is opened, the restricting part 68 retreats from the restricted part 67f as shown in FIG. 7C and the second segmented member 3c becomes a state in which it can rotate. Therefore, the elastic energy stored in the elastic member 63 is released in a short period of time, and the second segmented member 3c is vigorously opened as shown in FIG. 7D. At this time, the interlocking part 67b of the second segmented member 3c pushes the second arm 67e of the rotating member 67a, and thereby the rotating member 67a rotates around the rotation center 67c. Then, the first arm 67d of the rotating member 67a pushes the coated part clamp 15 upward. Since a magnetic force decreases as a magnet 12a and an attracted member 15d move away from each other, when the coated part clamp 15 is opened to a certain extent, an opening force of the torsion coil spring 15f overcomes a closing force of the magnet 12a, and the coated part clamp 15 is opened.

As described above, the fusion splicer 1 of one or more embodiments includes the heater 2a which heats the glass parts G of the optical fibers F1 and F2, the lower clamp 12 on which the optical fiber F1 or F2 is placed, the coated part clamp 15 which sandwiches the optical fiber F1 or F2 between the coated part clamp 15 and the lower clamp 12, the windproof cover 3 which covers the heater 2a and the coated part clamp 15, and the retreat mechanism 60 which causes the coated part clamp 15 to retreat from the lower clamp 12. The retreat mechanism 60 includes the power source 60a, the elastic member 63 that is elastically deformed by power received from the power source 60a, the transmission part 67 that pushes the coated part clamp 15 upward due to an elastic force received from the elastic member 63, and the restricting part 68 which restricts displacement of the transmission part 67 in a state in which the windproof cover 3 (the first segmented member 3b and the second segmented member 3c) is closed. Then, The restricting part 68 releases restriction on displacement of the transmission part 67 in conjunction with an opening operation of the windproof cover 3. With such a configuration, the same operation and effect as those of the first example can be obtained.

Further, in one or more embodiments, the windproof cover 3 is constituted by the first segmented member 3b driven by the opening/closing mechanism 40 and the second segmented member 3c driven by the power source 60a.

Power of the power source 60a is transmitted to the second segmented member 3c via the elastic member 63. Then, the restricting part 68 fixed to the first segmented member 3b releases restriction on displacement of the transmission part 67 in conjunction with an opening operation of the first segmented member 3b. With this configuration, the coated part clamp 15 is opened in conjunction with an operation of the opening/closing mechanism 40 opening the first segmented member 3b, and thereby operability is improved. Also, since the power for opening the second segmented member 3c and the power for elastically deforming the elastic member 32 are obtained by the common power source 60a, increase in the number of actuators such as motors can be avoided.

Also, since the second arm 67e is longer than the first arm 67d, a force when the interlocking part 67b pushes the rotating member 67a can be amplified by the lever ratio and then transmitted to the coated part clamp 15. Therefore, even when a closing force (magnetic force of the magnet 12a) of the coated part clamp 15 is large, the coated part clamp 15 can be more reliably opened.

Further, the technical scope of the invention is not limited to one or more embodiments described above, and various modifications can be made without departing from the gist of the embodiments.

For example, the coated part clamp 15 and the lower clamp 12 in the first to fifth examples may be a portion of a detachable-type fiber holder. In this case, the lower clamp 12 is a main body of the fiber holder, and the coated part clamp 15 is attached to the main body to be openable and closable.

When a detachable-type fiber holder is employed, the optical fiber F1 or F2 is sandwiched by the fiber holder outside the device main body 2, and in this state, a portion of the coated part C can be removed and the optical fiber F1 or F2 can be cut by a predetermined length. Then, the optical fiber F1 or F2 can be mounted to the device main body 2 together with the fiber holder in a state in which the glass portion G is exposed by a predetermined length. Also, since the fusion splicer 1 of the first to fifth examples includes two coated part clamps 15, two retreat mechanisms 30 and 60 may be provided to open the respective coated part clamps 15. In this case, the two retreat mechanisms 30 and 60 in each of embodiments may be disposed at a distance in the left-right direction X.

Alternatively, for example, the rotating member 33b or 67a may be configured to be long in the left-right direction X so that the two coated part clamps 15 are opened by one rotating member 33b or 67a. In this case, the two coated part clamps 15 can be opened by one retreat mechanism 30 or 60.

Further, in the case of the first example, it may be configured such that two pins 33a are pushed upward by one rotating member 33b. In this case, in the retreat mechanism 30, only the number of pins 33a is set to two, and the two pins 33a need only be disposed at positions corresponding to the two coated part clamps 15.

Alternatively, it may be configured such that one of the coated part clamps 15 is opened when the other coated part clamp 15 is opened by connecting the two coated part clamps or the like. Also in this case, the two coated part clamps 15 can be opened by one retreat mechanism 30 or 60.

In addition, the components in one or more embodiments described above can be appropriately replaced with well-known components without departing from the scope of the invention, and furthermore, one or more embodiments described above and modified examples may be appropriately combined.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCES SIGNS LIST

1 Fusion splicer
2a Heater
3 Windproof cover
3b First segmented member
3c Second segmented member
12 Lower clamp
15 Coated part clamp
30, 60 Retreat mechanism
30a, 60a Power source
32, 63 Elastic member
33, 67 Transmission part
33a Pin
33b Rotating member
34, 68 Restricting part
40 Opening/closing mechanism
40a Cover driver
50a Second cover driver
C Coated part F1, F2 Optical fiber
G Glass part

The invention claimed is:

1. A fusion splicer comprising:
a heater that heats a glass of an optical fiber;
a pair of clamps that clamp a coated part of the optical fiber, wherein the pair of clamps is constituted by:
   a lower clamp on which a coated part of the optical fiber is disposed; and
   a coated part clamp that presses the coated part of the optical fiber against the lower clamp;
a windproof cover that covers the heater and the coated part clamp;
a retreat mechanism that causes the coated part clamp to retreat from the lower clamp;
an opening/closing mechanism that opens and closes the windproof cover; and
a pair of glass clamps attached to an inner surface of the windproof cover, wherein
the retreat mechanism comprises:
   a power source;
   a rotating member rotatable around a rotation center;
   an elastic member that receives power from the power source, and upon receiving the power, elastically deforms and stores elastic energy;
   a transmission part that receives elastic force from the elastic member and pushes the coated part clamp upward; and
   a restricting part that:
      restricts rotation of the rotating member while the elastic member stores the elastic energy and the windproof cover remains closed, and
      when the opening/closing mechanism opens the windproof cover, releases restriction on rotation of the rotating member by releasing the elastic energy stored in the elastic member.

2. The fusion splicer according to claim 1, wherein
the transmission part comprises a pin disposed between the coated part clamp and the rotating member and slidably movable in a vertical direction, and
the pin slides upward and pushes the coated part clamp upward when the rotating member receives the elastic force and rotates.

3. The fusion splicer according to claim 1, wherein
the transmission part comprises the rotating member, and
the rotating member pushes the coated part clamp upward when the rotating member receives the elastic force and rotates.

4. The fusion splicer according to claim 1, wherein the restricting part is fixed to the windproof cover.

5. The fusion splicer according to claim 1, wherein
the windproof cover is constituted by:
   a first segmented member opened and closed by the opening/closing mechanism; and
   a second segmented member opened and closed by a second opening/closing mechanism, and
the restricting part is fixed to the second segmented member.

6. The fusion splicer according to claim 1, wherein
the windproof cover is constituted by:
   a first segmented member opened and closed by the opening/closing mechanism; and
   a second segmented member driven by the power source,
power of the power source is transmitted to the second segmented member via the elastic member, and
the restricting part:
   is fixed to the first segmented member, and
   when the opening/closing mechanism opens the first segmented member, releases restriction on rotation of the rotating member.

* * * * *